US009879698B2

(12) United States Patent
Burkholder et al.

(10) Patent No.: US 9,879,698 B2
(45) Date of Patent: Jan. 30, 2018

(54) NOSE CONE AND SHAFT BALANCING ASSEMBLY (71) Applicant: Rolls-Royce North American Technologies Inc., Indianapolis, IN (US)

(72) Inventors: Graham Burkholder, Indianapolis, IN (US); Daniel Molnar, Lebanon, IN (US); Jared Schneider, Zionsville, IN (US); Matt Kappes, Greenwood, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 282 days.

(21) Appl. No.: 14/922,807

(22) Filed: Oct. 26, 2015

(65) Prior Publication Data
US 2017/0114800 A1   Apr. 27, 2017

(51) Int. Cl.
*F04D 29/66* (2006.01)
*F04D 29/32* (2006.01)
(Continued)

(52) U.S. Cl.
CPC .......... *F04D 29/662* (2013.01); *B64C 11/14* (2013.01); *F01D 5/027* (2013.01); *F02C 7/04* (2013.01); *F04D 29/329* (2013.01); *F01D 25/243* (2013.01); *F05D 2220/36* (2013.01); *F05D 2250/232* (2013.01); *F05D 2260/31* (2013.01); *F05D 2260/96* (2013.01); *Y02T 50/672* (2013.01)

(58) Field of Classification Search
CPC .......... F01D 5/027; F01D 25/243; F02C 7/04; F04D 29/329; F04D 29/662; B64C 11/14; F05D 2220/36; F05D 2250/232; F05D 2260/31; F05D 2260/96
See application file for complete search history.

(56) References Cited

U.S. PATENT DOCUMENTS 3,362,251 A   1/1968   Francis
4,393,650 A   7/1983   Pool
(Continued)

FOREIGN PATENT DOCUMENTS

DE   102010005987 A1   2/2011
DE   102010005986 A1   6/2011
(Continued)

OTHER PUBLICATIONS

European Patent Office, European Extended Search Report for corresponding EP Application No. 16191020.3 dated Mar. 3, 2017, 9pgs.

*Primary Examiner* — Igor Kershteyn
(74) *Attorney, Agent, or Firm* — Duane Morris LLP (57) ABSTRACT

A shaft balancing assembly comprising a nose cone and a plurality of balance weights. The nose cone is mounted to a rotatable shaft of a turbine machine via a plurality of elongated fasteners such that a central axis of the nose cone is alighted with the rotatable shaft. The nose cone comprises a flange extending axially from a leading tip to a trailing edge and a plurality of apertures each adapted to receive a balancing weight and an elongated fastener. The nose cone flange is formed from a filament wound composite material and has a uniform thickness.

17 Claims, 12 Drawing Sheets

(51) Int. Cl.
  *F01D 5/02*      (2006.01)
  *B64C 11/14*     (2006.01)
  *F02C 7/04*      (2006.01)
  *F01D 25/24*     (2006.01)

(56) References Cited

U.S. PATENT DOCUMENTS

| | | |
|---|---|---|
| 7,303,377 B2 | 12/2007 | Rockarts et al. |
| 7,306,432 B2 * | 12/2007 | Rockarts .................. F01D 5/027 416/144 |
| 8,215,910 B2 | 7/2012 | Belmonte et al. |
| 8,322,991 B2 | 12/2012 | MacFarlane et al. |
| 8,540,492 B2 | 9/2013 | Schreiber |
| 8,985,952 B2 | 3/2015 | Belmonte et al. |
| 9,540,939 B2 * | 1/2017 | Maliniak ................... F02C 7/04 |
| 2010/0258199 A1 * | 10/2010 | Schreiber ................... F02C 7/04 137/15.1 |
| 2012/0134843 A1 | 5/2012 | Bottome et al. |
| 2015/0047191 A1 | 2/2015 | Rosenau et al. |

FOREIGN PATENT DOCUMENTS

| | | |
|---|---|---|
| EP | 2458146 A1 | 11/2011 |
| FR | 2908827 A1 | 5/2008 |
| GB | 1020230.7 A | 2/1966 |
| GB | 2363170 A | 12/2001 |
| WO | 2015/057271 A1 | 4/2015 |

\* cited by examiner

NOSE CONE AND SHAFT BALANCING ASSEMBLY

FIELD OF THE DISCLOSURE

The present disclosure relates generally to turbine machines, and more specifically to a nose cone and shaft balancing assembly for a turbine machine.

BACKGROUND

Turbine machines provide energy for a wide range of uses. A turbine machine comprises at least a rotatable shaft and a plurality of blades. In some applications the plurality of blades comprise a fan. Examples of turbine machines include turbofan, turbojet, turboshaft, and turboprop engines; gas turbine engines; and wind turbines.

The energy produced by a turbine machine is generally either electrical or mechanical. As one example, turbine machines are used to provide propulsion to an aircraft. A typical turbine engine comprises a compressor, a combustor, a high-pressure turbine, and a low-pressure turbine.

In some turbine machines, particularly in turbine engines used for aircraft applications, it is desirable to attach a nose cone upstream from the plurality of blades of the turbine machine. Nose cones are sometimes referred to in the art as "intake cones" or "inlet cones." The nose cone can serve to reduce drag caused by the turbine machine, improve air flow to the plurality of blades, and avoid or limit damage potentially caused by impinging foreign objects. In supersonic aircraft, a nose cone is also advantageously used to slow the flow of air from supersonic flight speed to a subsonic speed before it enters the turbine machine.

In many applications a turbine machine must be balanced after the nose cone is mounted to the rotatable shaft and without removing the nose cone. Balancing a turbine machine, or the fan of a turbine machine, with the nose cone attached ensures that the turbine will not experience excessive vibrations during operation which can be caused by uneven weight distribution. Uneven weight distribution can be addressed during the balancing procedure by attaching the balance weights to the nose cone, fan, shaft, or other part of the turbine machine.

Figure 1A:
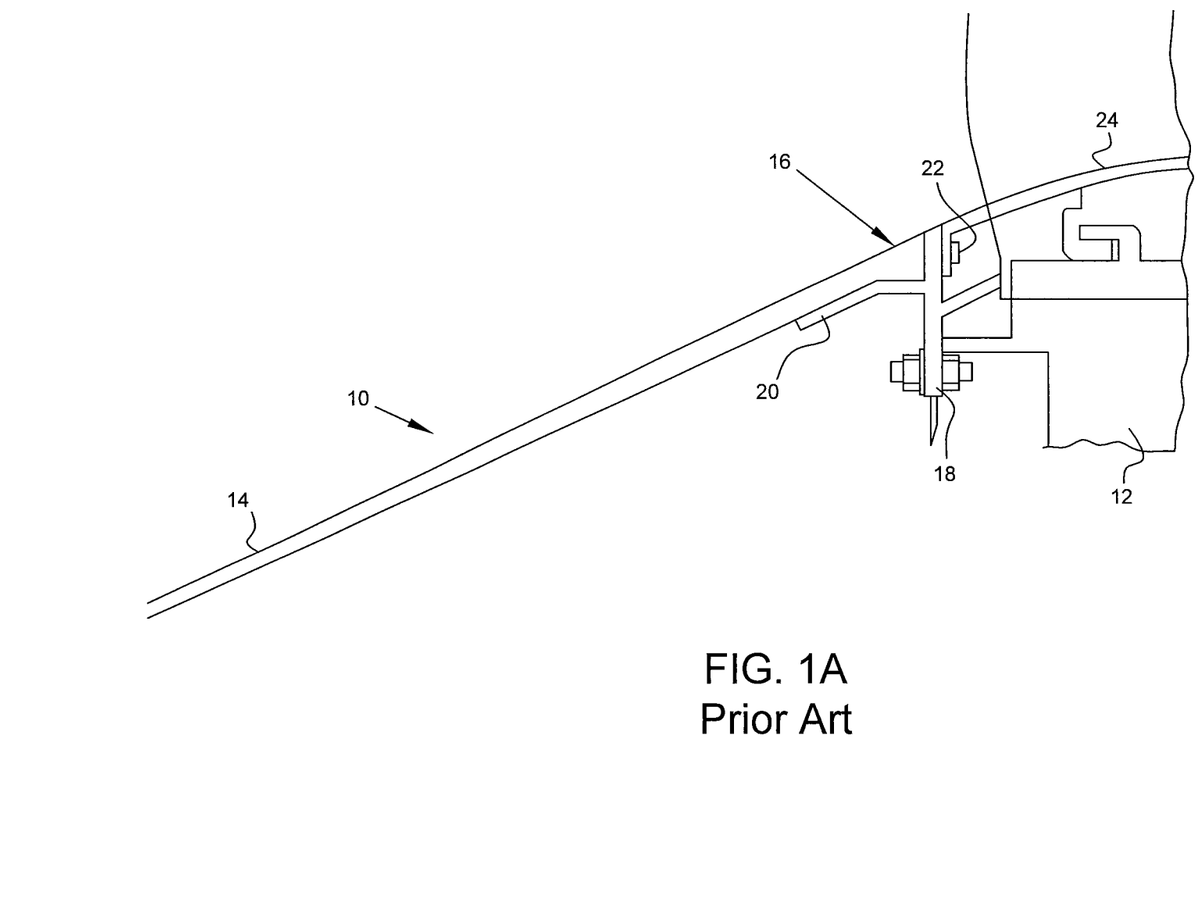
FIG. 1A is a partial sectional view of a nose cone connected to a fan rotor of an inlet fan of a gas turbine engine.

FIG. 1A is a partial sectional view of a nose cone 10 connected to a fan rotor 12 of an inlet fan of a gas turbine engine in accordance with conventional methods as described in U.S. Patent Application Publication No. 2011/0236217. The illustrated nose cone 10 comprises a flange member 14 which tapers to a leading cone tip (not shown) and a region proximate the trailing edge 16 having a radial thickness greater than that of the remainder of the flange member 14. A support ring 18 having an axially-extending flange 20 is connected to the fan rotor 12. A bolt 22 engages the trailing edge 16 of nose cone 10 to an axial member 24 and support ring 18. One disadvantage of the configuration shown in FIG. 1A and similar nose cone mounting configurations used in the art is that turbine balancing is difficult to perform because of the limited access to the plurality of bolts 22 which hold nose cone 10 to the fan rotor 12. Balancing is therefore typically performed with nose cone 10 removed from the fan rotor 12, and the re-connection of the nose cone 10 after balancing can introduce new weight imbalances.

Figure 1B:
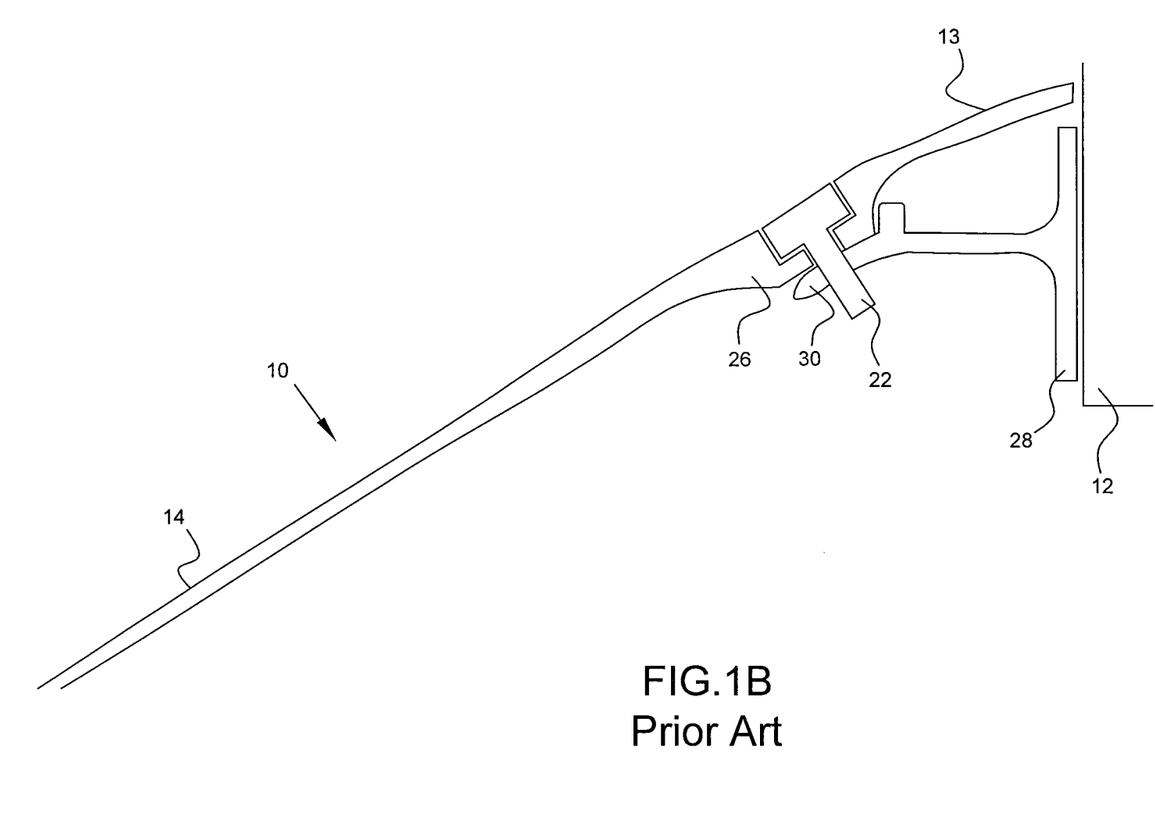
FIG. 1B is a partial sectional view of a nose cone connected to an inlet fan of a gas turbine engine.

In response to the shortcomings of the mounting configuration and nose cone 10 shown in FIG. 1A, configurations were developed to allow for turbine balancing to be performed with the nose cone 10 installed. FIG. 1B is a partial sectional view of a nose cone 10 connected to an inlet fan of a gas turbine engine as described in U.S. Pat. No. 8,540,492. As illustrated in FIG. 1B, a nose cone 10 comprises a flange member 14 which axially extends from leading cone tip (not shown) to a trailing edge 13. A radially thick mounting ring 26 is formed proximate the trailing edge 13. The mounting ring 26 defines a plurality of apertures 15 that are spaced apart about the circumference of the mounting ring 26. One or more of the apertures may include a recessed portion 17 for holding one or more balance weights 19. A fan rotor 12 is connected to retaining ring 28 having a mounting flange 30. A bolt 22 extends through an aperture 15 to connect nose cone 10 to the mounting flange 30. The bolt 22 also retains balance weight 19 within the recessed portion 17. As can be appreciated, the one or more balance weights 19 may be added or removed from recessed portions 17 without dismounting the nose cone 10 from the mounting flange 30.

Although the mounting configuration illustrated in FIG. 1B allows for turbine balancing without the need to dismount the nose cone 10, this configuration has its own drawbacks. In particular, it is preferred to manufacture nose cone 10 from fiber composite materials, also called filament wound composites. Typically a glass or carbon filament is wound around a rotating mandrel and, either contemporaneous with winding or after winding is complete, coated with a composite material resin which is then cured. The manufacture of components having varying thicknesses is difficult, time-consuming, and expensive. Thus, the nose cone 10 illustrated in FIG. 1B having an enlarged radial thickness at the mounting ring 26 is difficult, time-consuming, and expensive to manufacture.

BRIEF DESCRIPTION OF THE DRAWINGS

The following will be apparent from elements of the figures, which are provided for illustrative purposes and are not necessarily to scale.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

As used herein, a turbine machine is understood to reference any machine using a turbine including gas turbine engines, wind turbines, steam turbines, water turbines, and the like. A turbine machine comprises at least a rotatable shaft and a plurality of blades.

The present disclosure is directed to a nose cone for attachment to a turbine machine. Although the disclosed nose cone is advantageously used with any number of turbine machines, the embodiments below may describe the nose cone as used with a turbine engine, such as a gas turbine engine for aviation applications. However, one of skill in the art would understand that the disclosed apparatus, system, and method are not so limited.

This disclosure presents embodiments to overcome the aforementioned deficiencies of nose cones and nose cone mounting configurations. More specifically, this disclosure is directed to a nose cone, nose cone assembly, and shaft balancing assembly which allow for turbine balancing with the nose cone connected to the turbine machine while additionally improving ease of manufacture. Detailed descriptions of the disclosed nose cone, nose cone assembly, and shaft balancing assembly, and additional advantages thereof, are presented below.

Figure 2:
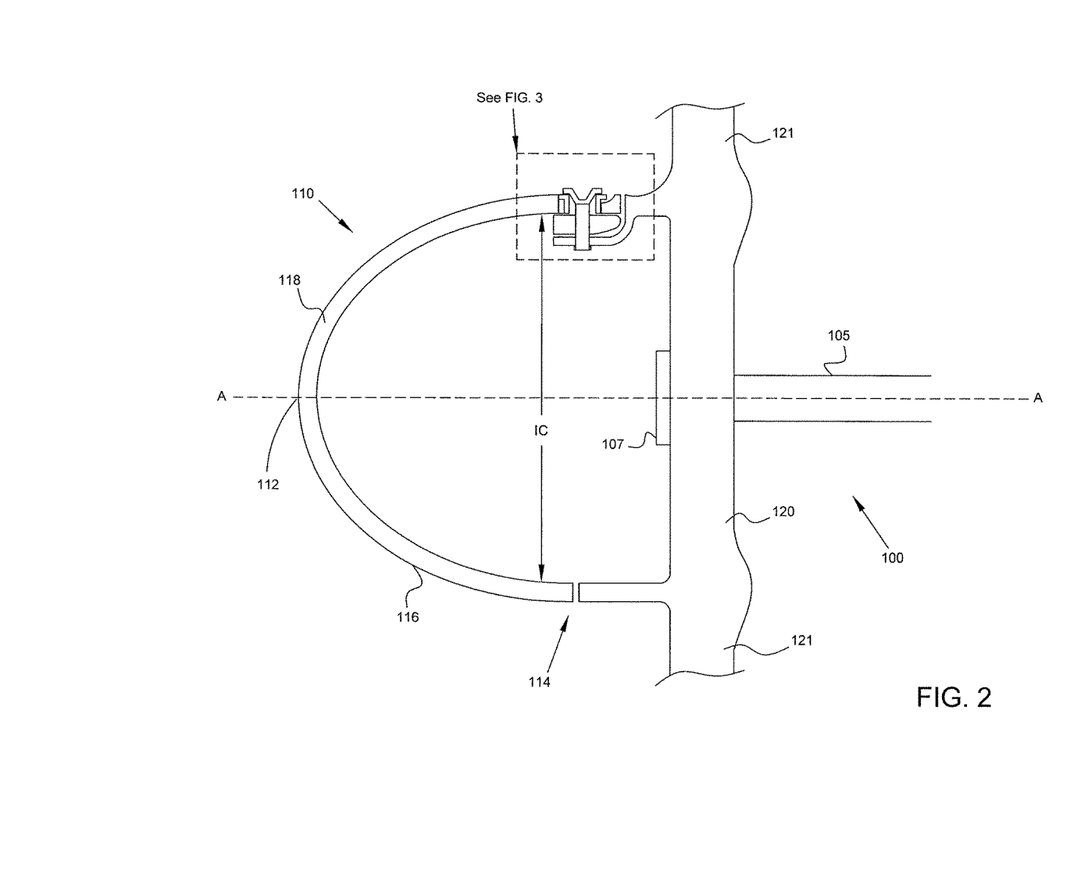
FIG. 2 is a sectional view of an exemplary shaft balancing assembly connected to a turbine machine in accordance with some embodiments of the present disclosure.
Figure 3:
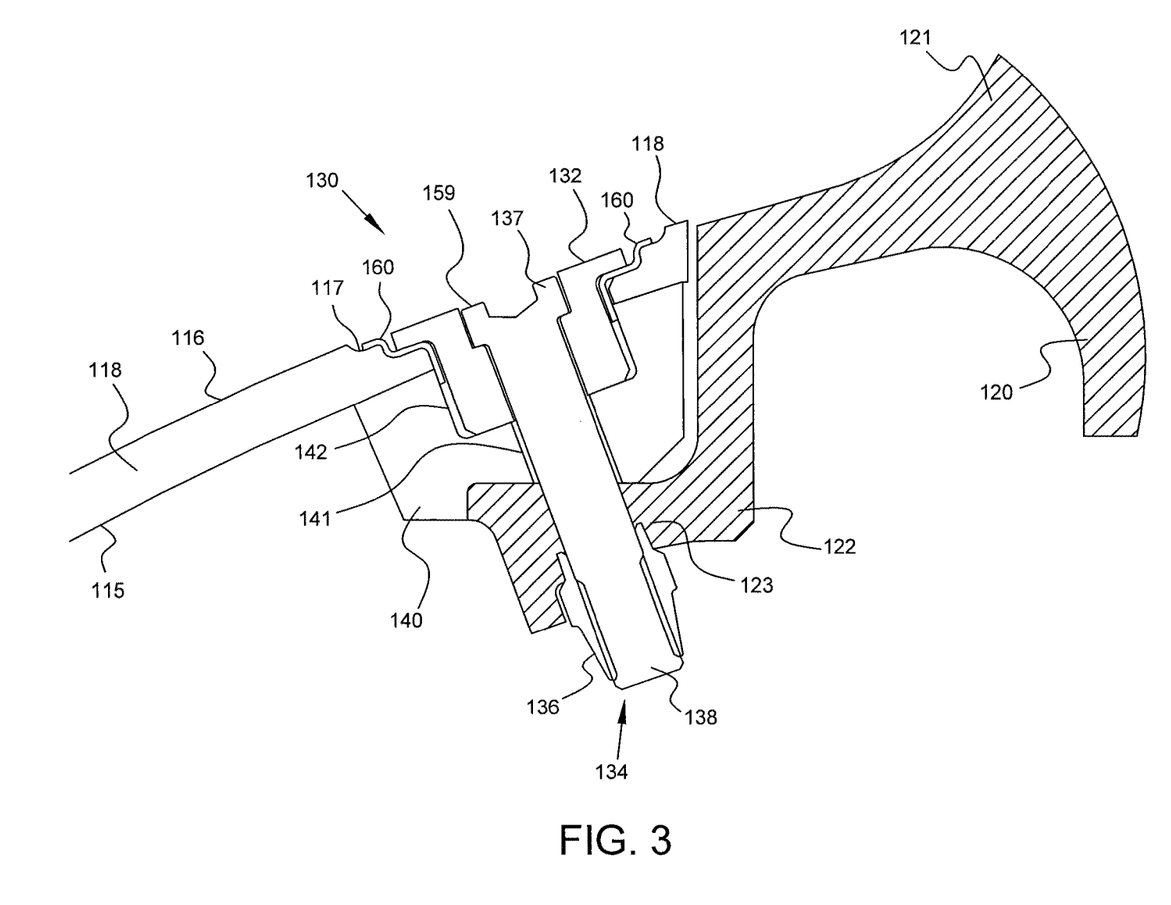
FIG. 3 is a detailed sectional view of an exemplary shaft balancing assembly connected to a turbine machine in accordance with some embodiments of the present disclosure.

FIG. 2 is a sectional view of an exemplary shaft balancing assembly 130 connected to a turbine machine 100 in accordance with some embodiments of the present disclosure. FIG. 3 is a detailed sectional view of an exemplary shaft balancing assembly 130 connected to a turbine machine 100 in accordance with some embodiments of the present disclosure.

Turbine machine 100 comprises rotatable shaft 105, fan blisk 120, and a plurality of fan blades 121. Fan blisk 120 is mounted to rotatable shaft 105 via a mounting plate 107. Fan blisk 120 is a combination of a fan rotor and fan blades. As illustrated in FIG. 2, fan blisk 120 additionally comprises a coupling flange 122 extending axially away from the fan blades 121 in an upstream direction. Coupling flange 122 has an aperture 123 adapted to receive an elongate fastener 134 such as a bolt, screw, or similar apparatus. In some embodiments, nose cone 110 is mounted to a fan rotor in lieu of a fan blisk 120. In other embodiments, nose cone 110 is mounted directly to a rotatable shaft 105 in lieu of a fan blisk 120.

Shaft balancing assembly 130 comprises a nose cone 110, a plurality of elongate fasteners 134 removably connecting the nose cone 110 to fan blisk 120, and a plurality of balance weights 132. In some embodiments, a shaft balancing assembly comprises a plurality of balance weights 132.

Figure 4A:
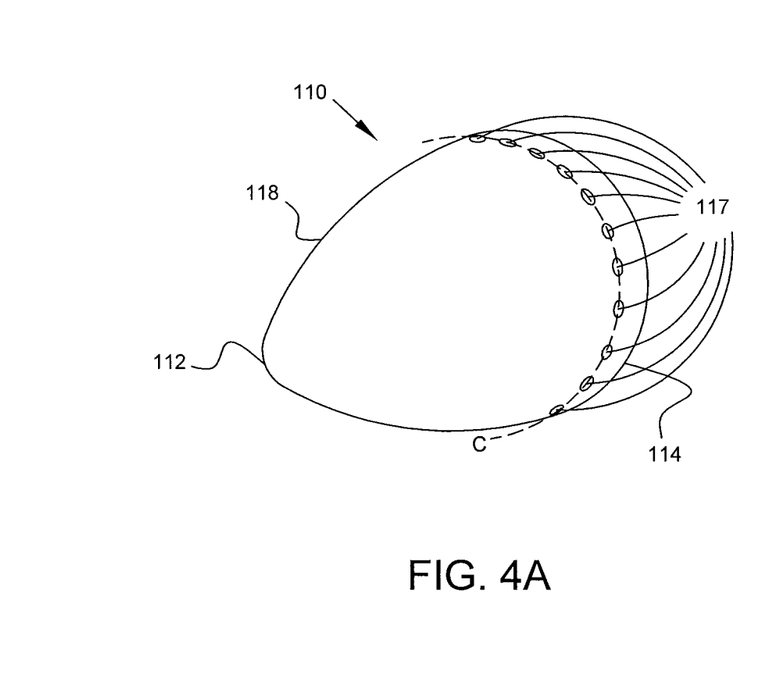
FIG. 4A is a perspective view of a nose cone in accordance with some embodiments of the present disclosure.
Figure 4B:
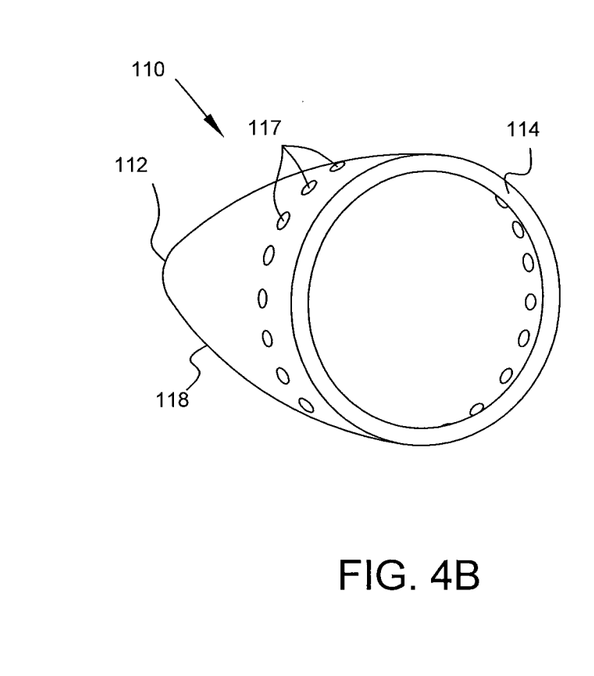
FIG. 4B is a perspective view of a nose cone in accordance with some embodiments of the present disclosure.

FIGS. 4A and 4B provide perspective views of nose cone 110, while FIGS. 4C through 4G provide various sectional views of nose cone 110. Nose cone 110 comprises a flange 118 extending axially from a leading tip 112 to a trailing edge 114. Nose cone 110 thus tapers from the circular trailing edge 114 to the leading tip 112. Nose cone 110 can have an elliptical, conical, or biconical shape. Nose cone 110 has a central axis A which is axially aligned with rotatable shaft 105 when nose cone 110 is mounted to the turbine machine 100.

Flange 118 has an outer surface 116 which defines an airflow path for air impinging on nose cone 110. In some embodiments, outer surface 116 may be coated with an erosion-resistant coating such as polyurethane.

A plurality of apertures 117 are formed in flange 118 along a circumference C proximate trailing edge 114. In some embodiments, apertures 117 each comprise a bore 113 and recessed portion 111 which can be seen in FIGS. 4E and 4F. Bore 113 is adapted to receive the body 138 of elongated fastener 134, and recessed portion 111 is adapted to receive the head 137 of elongated fastener 134 or at least a portion of a balance weight 132 or both. Elongated fastener 134 is dimensioned such that the outer surface 159 of the head 137 is flush with the outer surface 116 of flange 118.

Figure 4C:
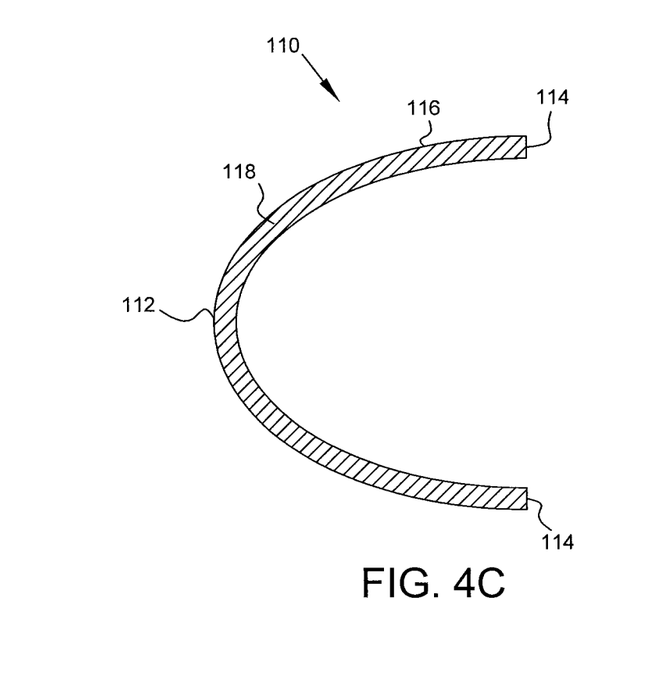
FIG. 4C is a sectional view of a nose cone in accordance with some embodiments of the present disclosure.
Figure 4D:
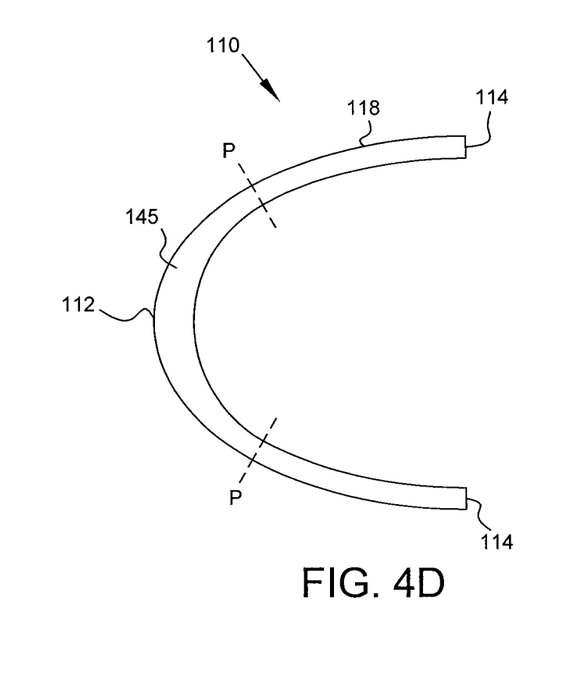
FIG. 4D is a sectional view of a nose cone in accordance with some embodiments of the present disclosure.
Figure 4E:
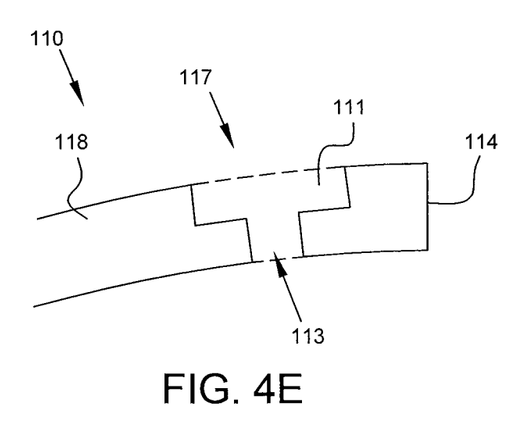
FIG. 4E is a detailed sectional view of an aperture of a nose cone in accordance with some embodiments of the present disclosure.
Figure 4F:
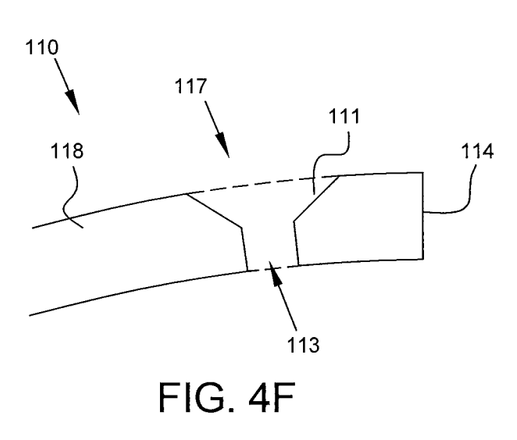
FIG. 4F is a detailed sectional view of an aperture of a nose cone in accordance with some embodiments of the present disclosure.
Figure 4G:
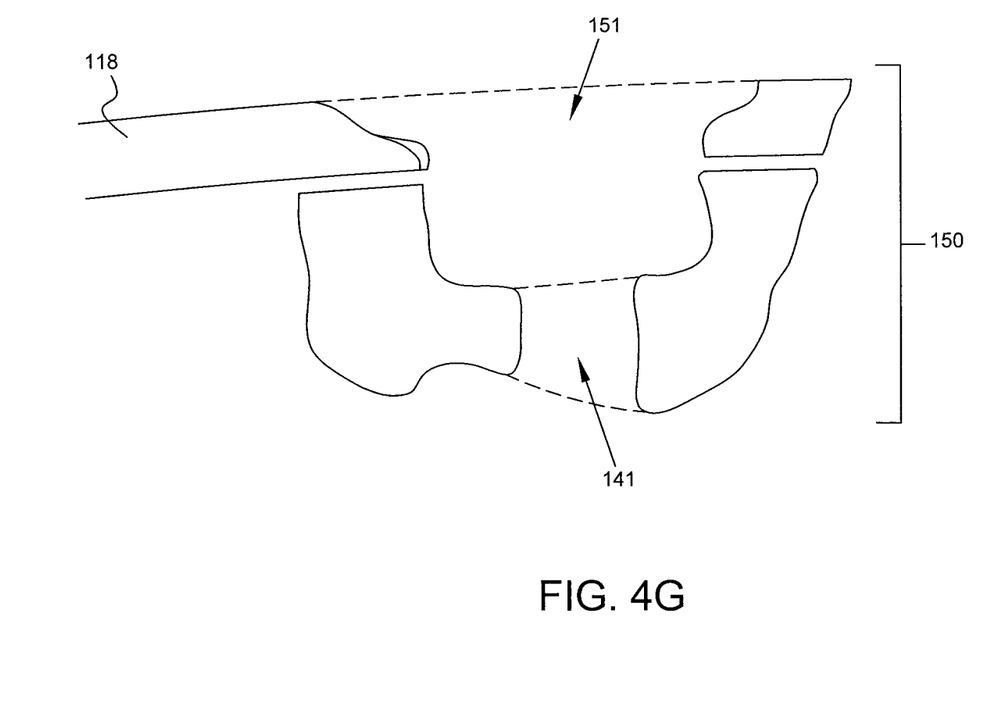
FIG. 4G is a detailed sectional view of an aligned pair comprising a flange bore and a module bore in accordance with some embodiments of the present disclosure.

In some embodiments recessed portion 111 is a counterbore as shown in FIG. 4E; in other embodiments recessed portion 111 is a countersink as shown in FIG. 4F. In still further embodiments recessed portion 111 is an aperture not limited to any particular shape or structure.

In some embodiments, nose cone 110 is formed from a filament wound composite material. In some embodiments, nose cone 110 is formed from a carbon fiber filament wound and coated in a resin which is subsequently cured prior to nose cone 110 use. During manufacture, flange 118 is formed as a uniform thickness and apertures 117 are added following resin cure.

In some embodiments, as illustrated in FIG. 4C, flange 118 has a uniform thickness from the leading point 112 to the trailing edge 114 excluding apertures 117. A uniform thickness provides for improved ease of manufacture of filament wound composites. In other embodiments, flange 118 is formed with a thickness that does not vary by more than fifty percent from the leading tip 112 of nose cone 110 to the trailing edge 114 of the flange 118. In still further embodiments, flange 118 is formed with a thickness that does not vary by more than twenty-five percent from the leading tip 112 of nose cone 110 to the trailing edge 114 of the flange 118.

In some embodiments, as illustrated in FIG. 4D, nose cone 110 comprises a forward portion 145 defining leading point 112 and having a thickness greater than the thickness of flange 118. Flange 118 extends axially away from forward portion 145 starting at tangency point P and terminating at trailing edge 114. Between tangency point P and trailing edge 114, flange 118 has a uniform thickness excluding apertures 117.

Nose cone 110 is mounted to fan blisk 120 by elongated fasteners 134 which are removably disposed in recessed portion 111, bore 113, and aperture 123. In some embodiments elongate fastener 134 is a threaded bolt held in place by a nut 136 which retains elongate fastener 134 with tension against coupling flange 122. In some embodiments aperture 123 is threaded and adapted to receive a threaded portion of elongate fastener 134.

In some embodiments an alignment module 140 is additionally disposed between flange 118 and coupling flange 122. Alignment module 140 defines an alignment module bore 141 adapted to receive elongated fastener 134. Alignment module 140 is dimensioned to be removably located and abutted against coupling flange 122 and inner surface 115 of flange 118. Alignment module 140 is additionally positioned such that each module bore 141 is aligned with a bore 113 of aperture 117 to thereby form an aligned pair 150 of bore 113 and a module bore 141. Aligned pair 150 forms a recessed cavity 151, illustrated in FIG. 4G, adapted to receive a balancing weight 132 and elongated fastener 134.

In some embodiments alignment module 140 is a compression molded material. In some embodiments alignment module 140 further comprises an alignment module recessed cavity 142 adapted to receive at least a portion of balance weight 132. Alignment module recessed cavity 142 can be formed as a counterbore, countersink, or similar structure.

In some embodiments alignment module 140 is bonded to the inside surface 115 of flange 118. In other embodiments, alignment module 140 is held in place between flange 118 and coupling flange 122 by elongated fastener 134.

In some embodiments a plurality of discrete alignment modules 140 are provided, with each alignment module 140 aligned with a aperture 117 of nose cone 110. In other embodiments alignment module 140 comprises a continuous ring 900 defining a plurality of module bores 141 spaced apart around an inner circumference IC of nose cone 110, the ring adhering to the inner surface 115 of flange 118 and being positioned so that each module bore 141 forms an aligned pair 150 with a aperture 117 of flange 118. Aligned pairs 150 each form a recessed cavity 151 adapted to receive a balancing weight 132 and elongated fastener 134.

Figure 8:
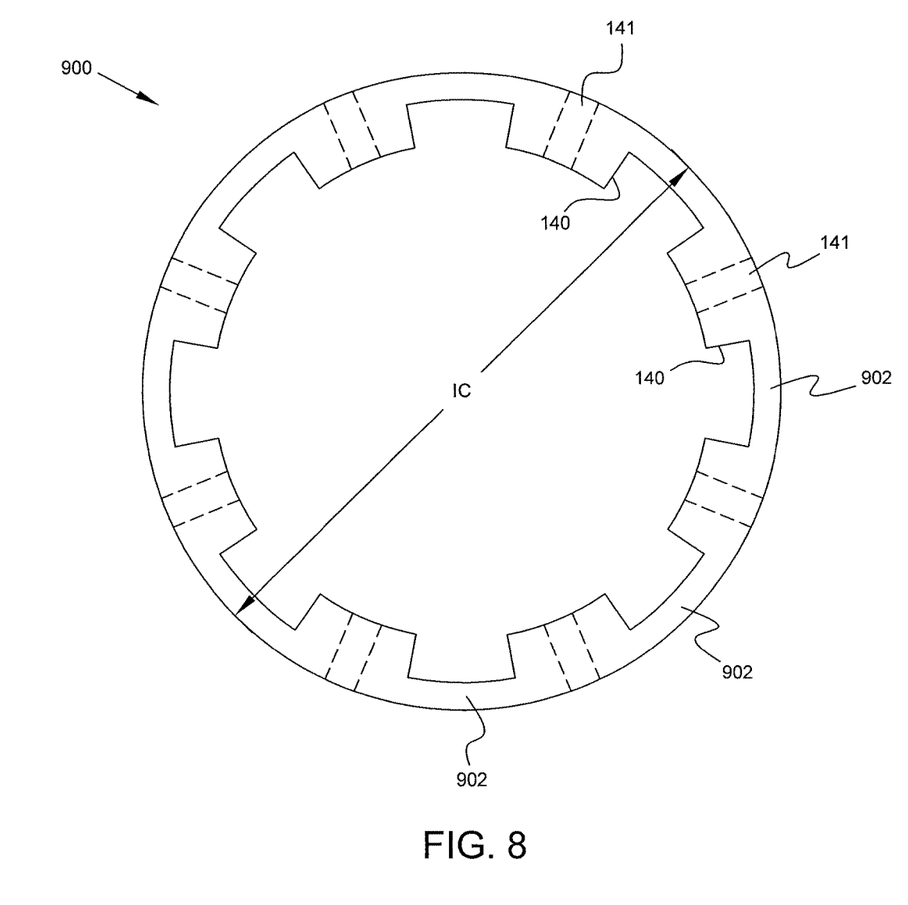
FIG. 8 is a profile view of a ring-type alignment module in accordance with some embodiments of the present disclosure.

FIG. 8 is a profile view of a ring-type alignment module 900 comprising a plurality of alignment modules 140 connected together by circumferential portions 902. Each alignment module 140 defines at least an alignment module bore 141. The ring 900 is dimensioned to fit within the inner circumference IC of nose cone 110 proximate trailing edge 114.

In embodiments having discrete- and ring-type alignment modules 140, the elongated fastener 134 extends through an aligned pair 150 and engages a portion of the turbine machine 100 for mounting the nose cone 110 to the rotatable shaft 105, specifically the coupling flange 122. One or more of the elongated fasteners 134 retain one or more balance weights 132 within a aperture 117 and/or recessed cavity 151.

Figure 5A:
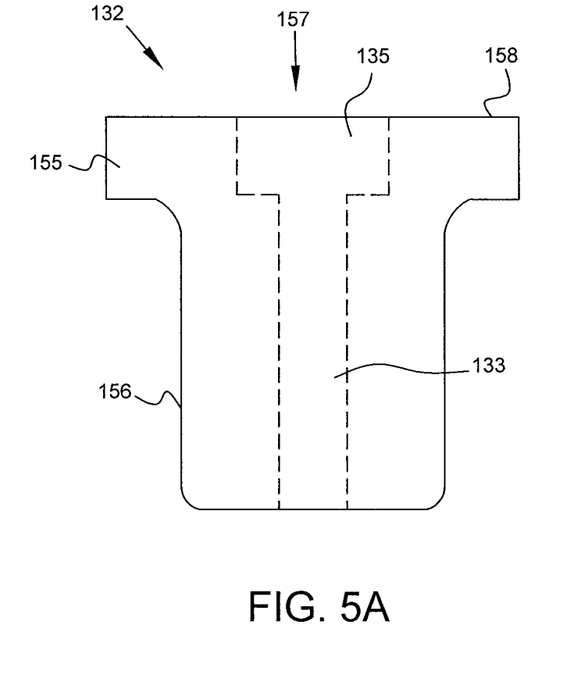
FIG. 5A is a side profile view of a balancing weight in accordance with some embodiments of the present disclosure.
Figure 5B:
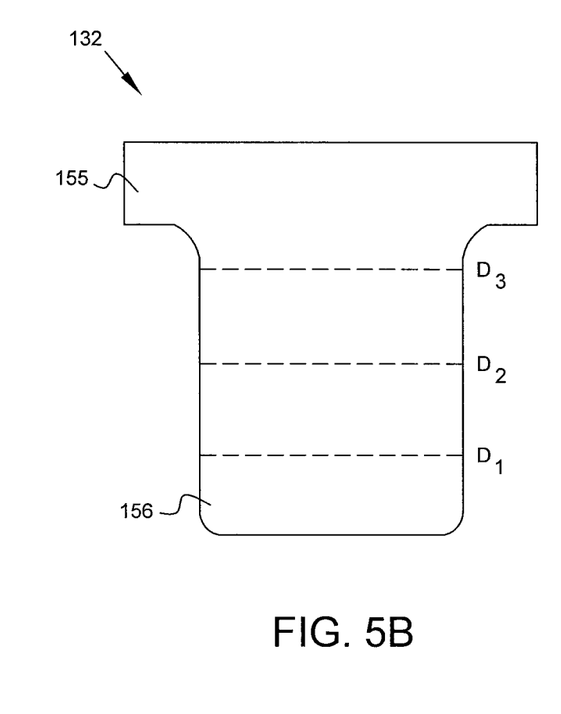
FIG. 5B is a side profile view of a balancing weight in accordance with some embodiments of the present disclosure.

Shaft balancing assembly 130 comprises a plurality of balance weights 132 which are shown in FIGS. 3, 5A, and 5B. In some embodiments a balancing weight 132 is formed with a head portion 155 and body portion 156. Balancing weight 132 has a recessed cavity 157 which in some embodiments comprises a balancing weight bore 133 and balancing weight counterbore 135. As illustrated, a balancing weight 132 functions to transfer the clamping load of elongated fastener 134 to flange 118 of nose cone 110. Further, balancing weight 132 is dimensioned such that the outer surface 158 of the head portion 155 is flush with outer surface 116 of flange 118.

Balance weights 132 are formed to have varying or incremental masses. In one embodiment, balance weights 132 are bimetallic, with the head 155 and an upper portion of body 156 formed from a first metal and a lower portion of body 156 formed from a second metal. When installed, a balancing weight 132 is disposed in recessed cavity 151 of aligned pair 150, or, in some embodiments simply in aperture 117 of nose cone 110. A balancing weight 132 is thus retained radially interior to the airflow path defined by the outer surface 116 of flange 118.

As illustrated in FIG. 5B, the junction between the first and second metals can be set at a varying depth, as illustrated by a first depth $D_1$, second depth $D_2$, and third depth $D_3$. By varying the depth of the junction and the selection of the metals used to form a balancing weight 132, the mass of such balancing weight 132 can be varied.

As an example, aluminum is used as the first metal and forms the head 155 and an upper portion of the body 156 of balancing weight 156. Tungsten is used as the second metal and forms a lower portion of the body 156 of balancing weight 156. When the junction between the aluminum and tungsten is set at depth $D_1$, a first mass is achieved in the balancing weight 132. When the junction between the aluminum and tungsten is set at depth $D_2$, a second mass is achieved in the balancing weight 132 with second mass being larger than first mass.

In some embodiments a set of balance weights 132 with varying masses is provided as a kit for performing shaft balancing. Nose cone 110 is mounted to fan blisk 120 using a plurality of elongated fasteners 134, allowing for the removal of any one elongated fastener—or, indeed, of potentially several elongated fasteners 134—at any one time while maintaining the nose cone 110 mounted to fan blisk 120. Upon removal of an elongated fastener 134, a balancing weight 132 of a first mass can be replaced with a balancing weight 132 of a second mass to aid in shaft balancing. Thus a balancing weight 132 is removable from a aperture 117 of nose cone 110 while the nose cone 110 is mounted to rotatable shaft 120.

In some embodiments, an erosion resistant metallic insert 160 is disposed between flange 118 and balance weight 132. Metallic insert 160 provides protection to areas of the aperture 117 which may be exposed to the air flowpath.

Figure 6:
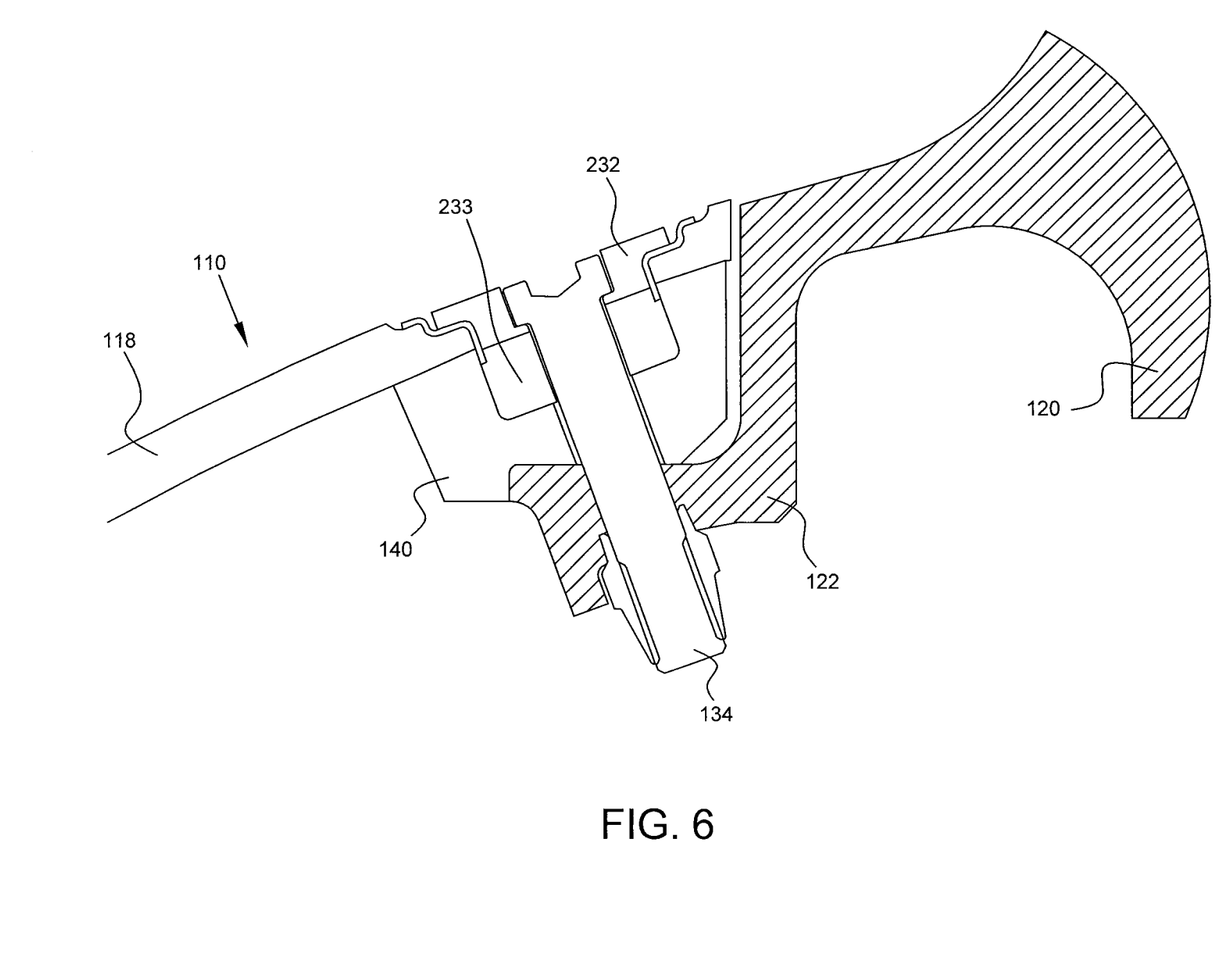
FIG. 6 is a detailed sectional view of an exemplary shaft balancing assembly connected to a turbine machine in accordance with some embodiments of the present disclosure.

In another embodiment presented in FIG. 6, a modified balancing weight 232 does not completely fill recessed cavity 151, leaving a void 233. In this embodiment, modified balancing weight 232 can be formed from a monometallic, bimetallic, metallic compound, or other material. To achieve varying masses in a set of modified balance weights 232, each modified balancing weight 232 may be formed at a different depth resulting in a different volume and mass. Based on the depth of a given modified balancing weight 232, void 233 is larger or smaller as modified balance weights 232 are exchanged during the shaft balancing process.

Figure 7:
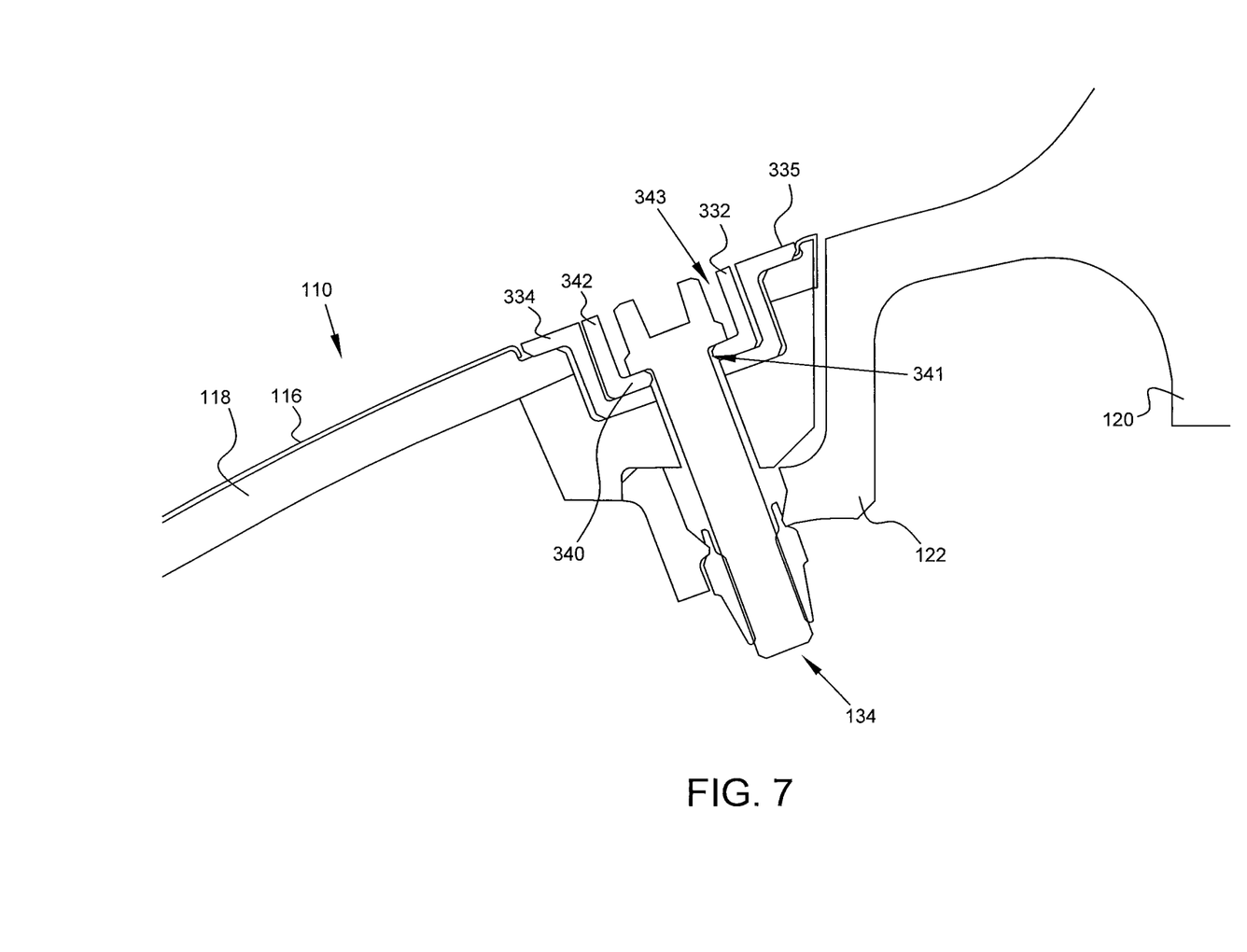
FIG. 7 is a detailed sectional view of an exemplary shaft balancing assembly connected to a turbine machine in accordance with some embodiments of the present disclosure.

In another embodiment presented in FIG. 7, cup washers 332 are used as balance weights. Cup washer 332 comprises a lower portion 340 defining a washer bore 341 and an annular side portion 342 extending from lower portion 340 so as to form a washer cavity 343. A transfer insert 334 is disposed between the cup washer 332 and alignment module. Transfer insert 334 transfers clamp load from the elongated fastener 134 to flange 118 and covers areas of aperture 117 which are exposed to the air flowpath. In some embodiments transfer insert 334 is formed from a metallic compound. In some embodiments transfer insert 334 is adhered to flange 118. In some embodiments transfer insert 334 is dimensioned such that an outer surface 335 of transfer insert 334 is flush with outer surface 116 of flange 118.

To achieve varying masses in a set of cup washers 332, each cup washer 332 may have different dimensions resulting in a different volume and mass. In some embodiments the height of the annular side portion 342 of each cup washer 332 is varied through a set of cup washers 332 to achieve a set having varying masses.

The disclosed nose cones, nose cone assemblies, and shaft balancing assemblies provide numerous advantages over the prior art. Elongated fastener heads 137 exposed to the air flowpath allow for balancing—such as fan trim balancing and shaft balancing—to be performed with the nose cone 110 mounted to the fan blisk 120. Because the nose cone 110 is mounted using a plurality of elongated fasteners 134, up to several elongated fasteners 134 can be removed at a time while maintaining the nose cone 110 mounted. This allows for change out of balance weights 132 or cup washers 332 during the balancing process.

Further, the disclosed nose cone 110 provides for improved ease of manufacturing over the prior art because flange 118 comprises a uniform thickness. During the manufacturing process for a filament wound composite, no non-uniform thicknesses such as an enlarged mounting flange need to be included. This makes manufacture of the disclosed nose cone 110 simpler, faster, and cheaper.

The present application discloses one or more of the features recited in the appended claims and/or the following features which, alone or in any combination, may comprise patentable subject matter.

According to an aspect of the present disclosure, a turbine machine comprises a rotatable shaft, a nose cone having a central axis mounted to the rotatable shaft so that the central axis is axially aligned with the rotatable shaft, the nose cone comprising a flange extending axially from a leading tip of the nose cone to a trailing edge at a base of the nose cone and radially around the central axis, the flange having an outer surface defining an airflow path and one or more apertures; and a shaft balancing assembly comprising one or more balance weights positioned at least partially in the one or more apertures, one or more of the balance weights being removable from the apertures while the nose cone is mounted to the shaft, wherein the flange is formed with a thickness that does not vary by more than fifty percent from the leading tip of the cone to the trailing edge of the flange, and wherein the shaft balancing assembly further comprises one or more alignment modules, each module defining one or more bores, the one or more modules adhering to an inner surface of the flange and being positioned so that each module bore is aligned with a flange aperture to thereby form an aligned pair of a flange aperture and a module bore, each of the aligned pairs forming a recessed cavity.

According to an aspect of the present disclosure, a balancing assembly for a rotating shaft in a turbine comprises a nose cone having a central axis and being adapted for mounting to the shaft so that the central axis is axially aligned with the shaft, the nose cone comprising a flange formed from filament wound composite material extending axially from a leading tip of the cone to a trailing edge at a base of the cone and radially around the central axis, the flange defining a plurality of apertures spaced apart around a circumference of the cone proximate the trailing edge of the flange, one or more alignment modules, each module defining one or more bores, the one or more modules adhering to an inner surface of the flange and being positioned so that each module bore is aligned with a flange aperture to thereby form an aligned pair of a flange aperture and a module bore, each of the aligned pairs forming a recessed cavity, one or more elongated fasteners, each fastener being positioned to extend through an aligned pair of a flange aperture and a module bore and being adapted to mount the cone to the shaft, and one or more balance weights, each of the balance weights being retained within a recessed cavity by an elongated fastener.

Although examples are illustrated and described herein, embodiments are nevertheless not limited to the details shown, since various modifications and structural changes may be made therein by those of ordinary skill within the scope and range of equivalents of the claims.

What is claimed is:

1. A turbine machine comprising:
   a rotatable shaft;
   a nose cone having a central axis mounted to said rotatable shaft so that said central axis is axially aligned with said rotatable shaft, said nose cone comprising a flange extending axially from a leading tip of said nose cone to a trailing edge at a base of said nose cone and radially around said central axis, said flange having an outer surface defining an airflow path and one or more apertures; and
   a shaft balancing assembly comprising one or more balance weights positioned at least partially in said one or more apertures, one or more of said balance weights being removable from said apertures while said nose cone is mounted to said shaft,
   wherein said flange is formed with a thickness that does not vary by more than fifty percent from said leading tip of said cone to said trailing edge of said flange, and wherein said shaft balancing assembly further comprises one or more alignment modules, each module defining one or more bores, said one or more modules adhering to an inner surface of said flange and being positioned so that each module bore is aligned with a flange aperture to thereby form an aligned pair of a flange aperture and a module bore, each of said aligned pairs forming a recessed cavity.

2. The turbine machine of claim 1 wherein said flange is formed with a substantially uniform thickness from said leading tip of said cone to said trailing edge of said flange.

3. The turbine machine of claim 2 wherein said flange is formed from filament wound composite material.

4. The turbine machine of claim 1 wherein said flange is formed from filament wound composite material.

5. The turbine machine of claim 1 wherein said flange defines a plurality of apertures along a circumference of said flange proximate said trailing edge, one or more modules being positioned to form an aligned pair of a flange aperture and a module bore with said apertures, each of said aligned pairs forming a recessed cavity.

6. The turbine machine of claim 5 comprising one or more elongated fasteners, each elongated fastener extending through an aligned pair, wherein one or more of said fasteners retain one or more balance weights within a recessed cavity.

7. The turbine machine of claim 6 wherein one or more of said fasteners engage a portion of said turbine machine to thereby mount said nose cone to said shaft.

8. The turbine machine of claim 7 wherein said one or more of said fasteners engage a portion of a rotor that is rotated by said shaft.

9. The turbine machine of claim 5 wherein one or more of said balance weights are retained radially interior to the airflow path defined by the outer surface of said flange.

10. A balancing assembly for a rotating shaft in a turbine, said assembly comprising:
- a nose cone having a central axis and being adapted for mounting to the shaft so that said central axis is axially aligned with the shaft, said nose cone comprising a flange formed from filament wound composite material extending axially from a leading tip of said cone to a trailing edge at a base of said cone and radially around said central axis, said flange defining a plurality of apertures spaced apart around a circumference of said cone proximate said trailing edge of said flange;
- one or more alignment modules, each module defining one or more bores, said one or more modules adhering to an inner surface of said flange and being positioned so that each module bore is aligned with a flange aperture to thereby form an aligned pair of a flange aperture and a module bore, each of said aligned pairs forming a recessed cavity;
- one or more elongated fasteners, each fastener being positioned to extend through an aligned pair of a flange aperture and a module bore and being adapted to mount said cone to the shaft; and
- one or more balance weights, each of said balance weights being retained within a recessed cavity by an elongated fastener.

11. The assembly of claim 10 wherein said alignment module comprises a ring defining a plurality of bores spaced apart around a circumference thereof, said ring adhering to an inner surface of said flange and being positioned so that each bore forms an aligned pair with a flange aperture.

12. The assembly of claim 10 comprising a plurality of alignment modules, each module defining a single bore, each of said modules adhering to an inner surface of said flange and being positioned so that said module bore forms an aligned pair with a flange aperture.

13. The assembly of claim 10 wherein said flange is formed with a uniform thickness from said leading tip of said cone to said trailing edge of said flange.

14. The assembly of claim 10 wherein said flange is formed with a thickness that does not vary by more than fifty percent from said leading tip of said cone to said trailing edge of said flange.

15. The assembly of claim 14 wherein said flange is formed with a thickness that does not vary by more than twenty-five percent from said leading tip of said cone to said trailing edge of said flange.

16. The assembly of claim 10 wherein one or more of said balance weights are bimetallic.

17. The assembly of claim 10 wherein said one or more balance weights are retained within said one or more recessed cavities radially interior to an outer surface of said flange.

* * * * *